US011500747B2

(12) United States Patent
Lee et al.

(10) Patent No.: US 11,500,747 B2
(45) Date of Patent: Nov. 15, 2022

(54) COMPUTER INITIALIZATION DEBUG MESSAGE DISPLAY SYSTEM

(71) Applicant: Dell Products L.P., Round Rock, TX (US)

(72) Inventors: Jing-Hui Lee, New Taipei (TW); Shih-Chieh Hsu, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 437 days.

(21) Appl. No.: 16/777,086

(22) Filed: Jan. 30, 2020

(65) Prior Publication Data

US 2021/0240586 A1  Aug. 5, 2021

(51) Int. Cl.
  *G06F 11/22* (2006.01)
  *G06F 9/445* (2018.01)

(52) U.S. Cl.
  CPC ........ *G06F 11/221* (2013.01); *G06F 9/44505* (2013.01)

(58) Field of Classification Search
  CPC .......................... G06F 11/221; G06F 9/44505
  See application file for complete search history.

(56) References Cited

U.S. PATENT DOCUMENTS

| | | | | |
|---|---|---|---|---|
| 5,850,562 A * | 12/1998 | Crump | ................ | G06F 11/3466 |
| | | | | 714/E11.21 |
| 6,516,410 B1 * | 2/2003 | Heller | ................... | G06F 9/4484 |
| | | | | 712/E9.082 |
| 10,628,285 B1 * | 4/2020 | Kollu | ..................... | G06F 21/575 |
| 2002/0065646 A1 | 5/2002 | Waldie et al. | | |
| 2003/0115445 A1 | 6/2003 | Heller | | |
| 2016/0261455 A1 * | 9/2016 | Su | ......................... | H04L 41/069 |
| 2019/0050279 A1 * | 2/2019 | Derr | .................... | G06F 11/0709 |
| 2019/0095316 A1 * | 3/2019 | Nagesh | ................... | H04L 69/22 |
| 2020/0201786 A1 * | 6/2020 | Ouziel | ................ | G06F 11/0745 |
| 2022/0209933 A1 * | 6/2022 | Chhabra | ............... | G06F 21/602 |

\* cited by examiner

*Primary Examiner* — Matthew M Kim
*Assistant Examiner* — Indranil Chowdhury
(74) *Attorney, Agent, or Firm* — Joseph Mencher

(57) ABSTRACT

A computing system initialization system includes a computing device that is coupled to a management device and that includes a processing system having at least one register storing debug-message-display-determination instructions, and a memory system that is coupled to the processing system and that includes Basic Input/Output System (BIOS) instructions that, when executed by the processing system, cause the processing system to provide a BIOS engine. The BIOS engine begins initialization operations and, during those initialization operations, generates at least one first debug message. The BIOS engine then accesses the at least one register included in the processing system to execute the debug-message-display-determination instructions and, in response, determines that the at least one first debug message should be displayed. In response, the BIOS engine transmits the at least one first debug message to the management device such that the management device displays the at least one first debug message.

20 Claims, 6 Drawing Sheets

COMPUTER INITIALIZATION DEBUG MESSAGE DISPLAY SYSTEM

BACKGROUND

The present disclosure relates generally to information handling systems, and more particularly to initializing information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server computing devices, desktop computing devices, laptop/notebook computing devices, tablet computing devices, mobile phones, and/or other computing devices known in the art, may perform a variety of initialization operations in order to initialize the computing device such that it may enter a runtime mode in which the computing device may be utilized by a user. However, some initialization operations can result provide for relatively substantial delays in the initialization of the computing device. For example, in some computing devices such as the server computing devices discussed above, the Basic Input Output System (BIOS) in the server device performs a boot process as part of the initialization operations that generates logs including debug messages, and a user of the server device may configure the BIOS to display those logs/debug messages on a management device/console coupled to that server device in order to, for example, allow the user to debug the server device in the event of an issue during the initialization operations. However, such initialization operations require the BIOS to determine which debug messages to provide for display on the management device (e.g., via a serial out connection) for each BIOS module provided by a BIOS driver included in the BIOS, which requires the execution of debug-message-display-determination code by the BIOS that is stored in a memory system that is connected to the BIOS processing system. As such, each debug message may be reviewed by the BIOS to determine whether to transmit that debug message to the management device, which delays the completion of the initialization operations due to the need for the BIOS processing system to perform memory system accesses in order to execute the debug-message-display-determination code in order to make the debug message display determinations.

In another example, in some computing devices such as the server computing devices discussed above, BIOS modules provided by the BIOS drivers in the BIOS may collect relatively large amounts of information during the initialization operations from devices that are coupled to the BIOS processing system by a relatively low-speed Input/Output (I/O) access connection. For example, Peripheral Component Interconnect express (PCIe) devices may include Vital Product Data (VPD), and a BIOS module in the BIOS may utilize addresses and data ports in order to transfer the VPD from VPD registers in the PCIe device to a BIOS storage (e.g., by communicating with the PCIe hardware and polling, for every 4 bytes of VPD, a "bit 15" flag that is associated with the VPD port and that indicates when the VPD transfer between the VPD register and the BIOS storage is completed, with the "bit 15" flag polled until the hardware finishes the 4 byte VPD transfer or a timeout happens, after which the VPD may be read.) As will be appreciated by one of skill in the art in possession of the present disclosure, the VPD discussed above is one example of data on a PCIe device that the BIOS may collect during initialization operations via a low-speed I/O access connection, and transfer and reading of the VPD can add several seconds to the initialization operations. Furthermore, such data (e.g., the VPD discussed above, Serial Presence Detect (SPD) data, etc.) may be collected via a low-speed I/O access connection by different BIOS modules, duplicating the low-speed I/O access operations and the time spent transferring and reading that data, further increasing the time required for the initialization operations.

Accordingly, it would be desirable to provide a computing system initialization system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a Basic Input/Output System (BIOS) engine that is configured to: begin initialization operations; generate, during the initialization operations, at least one first debug message; access at least one register included in the processing system to execute the debug-message-display-determination instructions and, in response, determine that the at least one first debug message should be displayed; and transmit, in response to determining that the at least one first debug message should be displayed, the at least one first debug message for display on a display device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
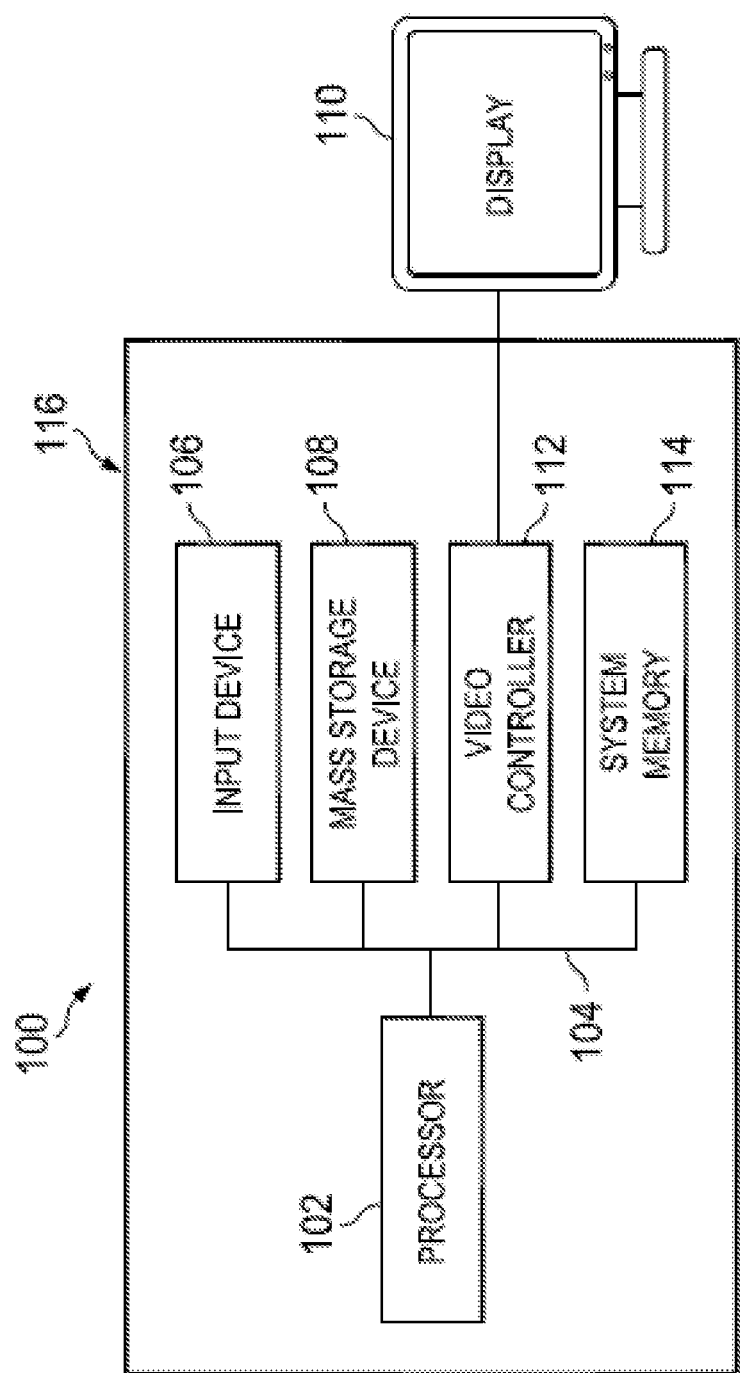
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
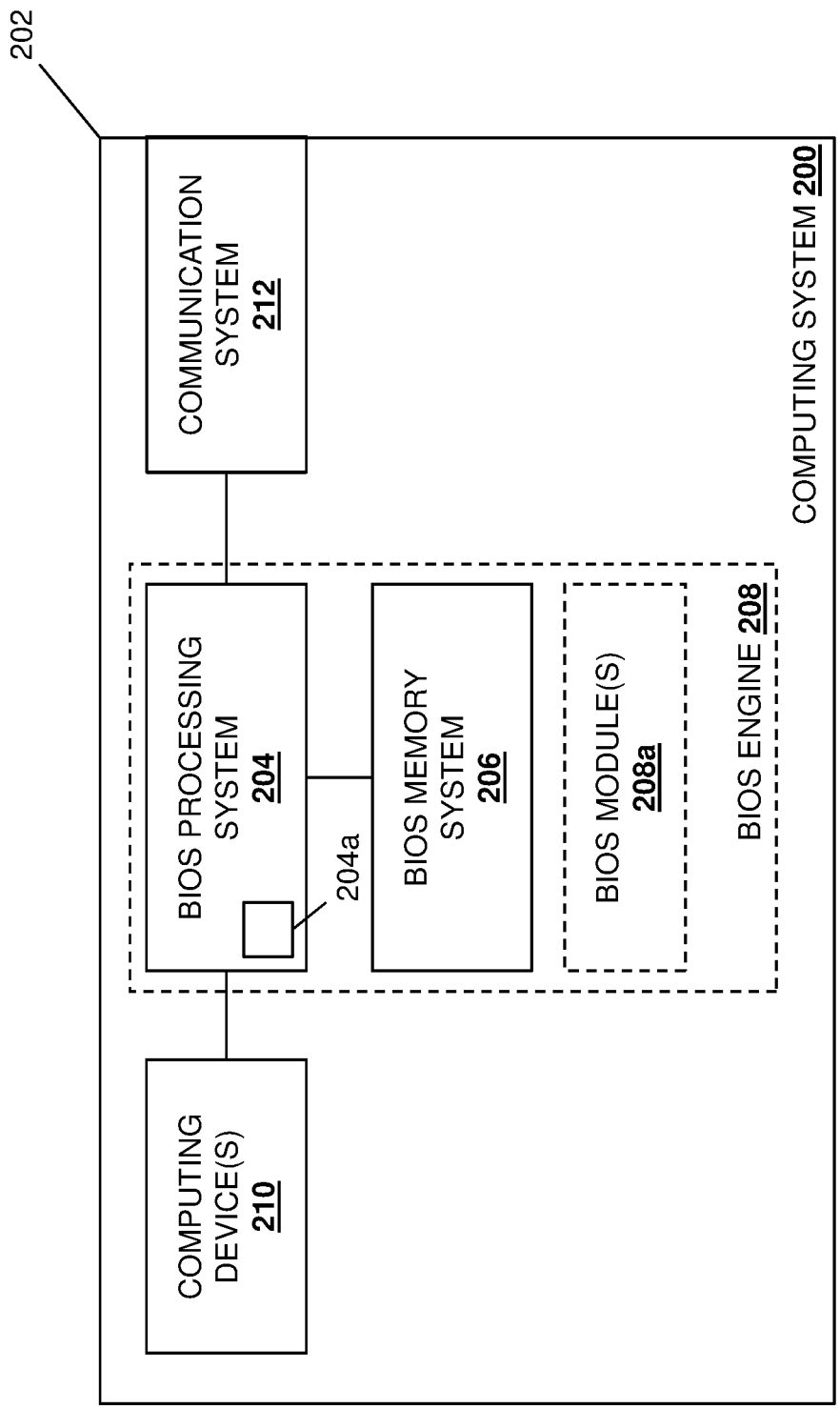
FIG. 2 is a schematic view illustrating an embodiment of a computing system initialization system.

Referring now to FIG. 2, an embodiment of a computing system 200 is illustrated that may provide the computing system initialization system of the present disclosure. In an embodiment, the computing system 200 may be provided by the IHS 100 discussed above with reference to FIG. 1 and/or may include some or all of the components of the IHS 100, and in specific examples may be provided by a server computing device, a desktop computing device, a laptop/notebook computing device, a tablet computing device, a mobile phone, and/or any other computing device that would be apparent to one of skill in the art in possession of the present disclosure. Furthermore, while one of skill in the art in possession of the present disclosure will recognize that the computing system is illustrated and discussed in the examples below as being provided by a server device, one of skill in the art in possession of the present disclosure will recognize that the functionality of the computing system 200 discussed below may be provided by other devices that are configured to operate similarly as computing system 200 discussed below. In the illustrated embodiment, the computing system 200 includes a chassis 202 that houses the components of the computing system 200, only some of which are illustrated below.

For example, the chassis 202 may house a Basic Input Output System (BIOS) processing system 204 (e.g., which may include the processor 102 discussed above with reference to FIG. 1) and a BIOS memory system 206 (e.g., which may include the memory 114 discussed above with reference to FIG. 1) that is coupled to the BIOS processing system 204 and that includes instructions that, when executed by the BIOS processing system, cause the BIOS processing system to provide a BIOS engine 208 that is configured to perform the functionality of the BIO engines and/or computing systems discussed below. For example, the BIOS processing system may be provided, at least in part, by a Central Processing Unit (CPU) included in the computing system 200, firmware included in the computing system 200, as well as other processing systems will fall within the scope of the present disclosure as well. Furthermore, as discussed below, the BIOS memory system 206 may include a BIOS Read Only Memory (ROM) (e.g., a flash ROM), as well as other BIOS memory subsystems that would be apparent to one of skill in the art in possession of the present disclosure. In specific examples, the BIOS engine 208 may include one or more BIOS modules 208a that may be provided by, for example, BIOS drivers that one of skill in the art in possession of the present disclosure will appreciate may include a collection of programs, code, or other instructions that may be stored in one or more Electronically Erasable Programmable Read Only Memory (EEPROM) devices (e.g., chips) that may be included on a motherboard provided in the computing system 200, and that may be configured to initialize the computing system 200 and provide a basic configuration for the computing system 200. However, while a specific example is provided, one of skill in the art in possession of the present disclosure will appreciate that the BIOS module(s) 208a may be provided by other subsystems while remaining within the scope of the present disclosure as well.

As illustrated in FIG. 2, the BIOS processing system 204 may include a plurality of registers 204a. For example, the BIOS processing system 204 may be provided by a CPU available from INTEL® Corporation of Santa Clara, Calif., United States, and the registers 204a may be provided by MultiMedia eXtension (MMX) registers in that CPU. As will be appreciated by one of skill in the art in possession of the present disclosure, MMX is a single instruction, multiple data instruction set that defines eight MMX registers (MM0-MM7) that it operates on, with each register being 64 bits wide and capable of holding either 64-bit integers, or multiple smaller integers in a "packed" format (thus allowing a single instruction to be applied to two 32-bit integers, four 16-bit integers, or eight 8-bit integers at once.) However, while particular registers in a particular CPU have been described, one of skill in the art in possession of the present disclosure will appreciate that a variety of registers in a variety of processing systems while fall within the scope of the present disclosure as well.

In the illustrated embodiment, the chassis 202 of the computing system 200 also houses one or more computing devices 210 that, as described herein, may be coupled to the BIOS processing system 204 by a relatively low-speed Input/Output (I/O) access connection. For example, as discussed above, computing device(s) 210 coupled to BIOS processing systems by relatively low-speed I/O access connections may include PCIe devices having Vital Product Data (VPD), and the BIOS module(s) 208a in the BIOS engine 208 may utilize addresses and data ports in order to transfer the VPD from VPD registers in the PCIe device/computing device 210 to a BIOS storage (e.g., by communicating with the PCIe hardware and polling, for every 4 bytes of VPD, a "bit 15" flag that is associated with the VPD port and that indicates when the VPD transfer between the VPD register and the BIOS storage is completed, with the "bit 15" flag polled until the hardware finishes the 4 byte VPD transfer or a timeout happens, after which VPD may be read.) However, as will be appreciated by one of skill in the art in possession of the present disclosure, the VPD on a PCIe device discussed above is one example of data that BIOS modules 208a in the BIOS engine 208 may collect via a relatively low-speed I/O access connection, and other types of data (e.g., Serial Presence Detect (SPD) data) accessible in other types of computing devices via relatively low speed I/O access connections will fall within the scope of the present disclosure as well.

The chassis 202 may also house a communication system 212 that is coupled to the BIOS processing system 204 and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific computing system 200 has been illustrated, one of skill in the art in possession of the present disclosure will recognize that computing systems (or other devices operating according to the teachings of the present disclosure in a manner similar to that described below for the computing system 200) may include a variety of components and/or component configurations for providing conventional computing system functionality, as well as the functionality discussed below, while remaining within the scope of the present disclosure as well.

Figure 3:
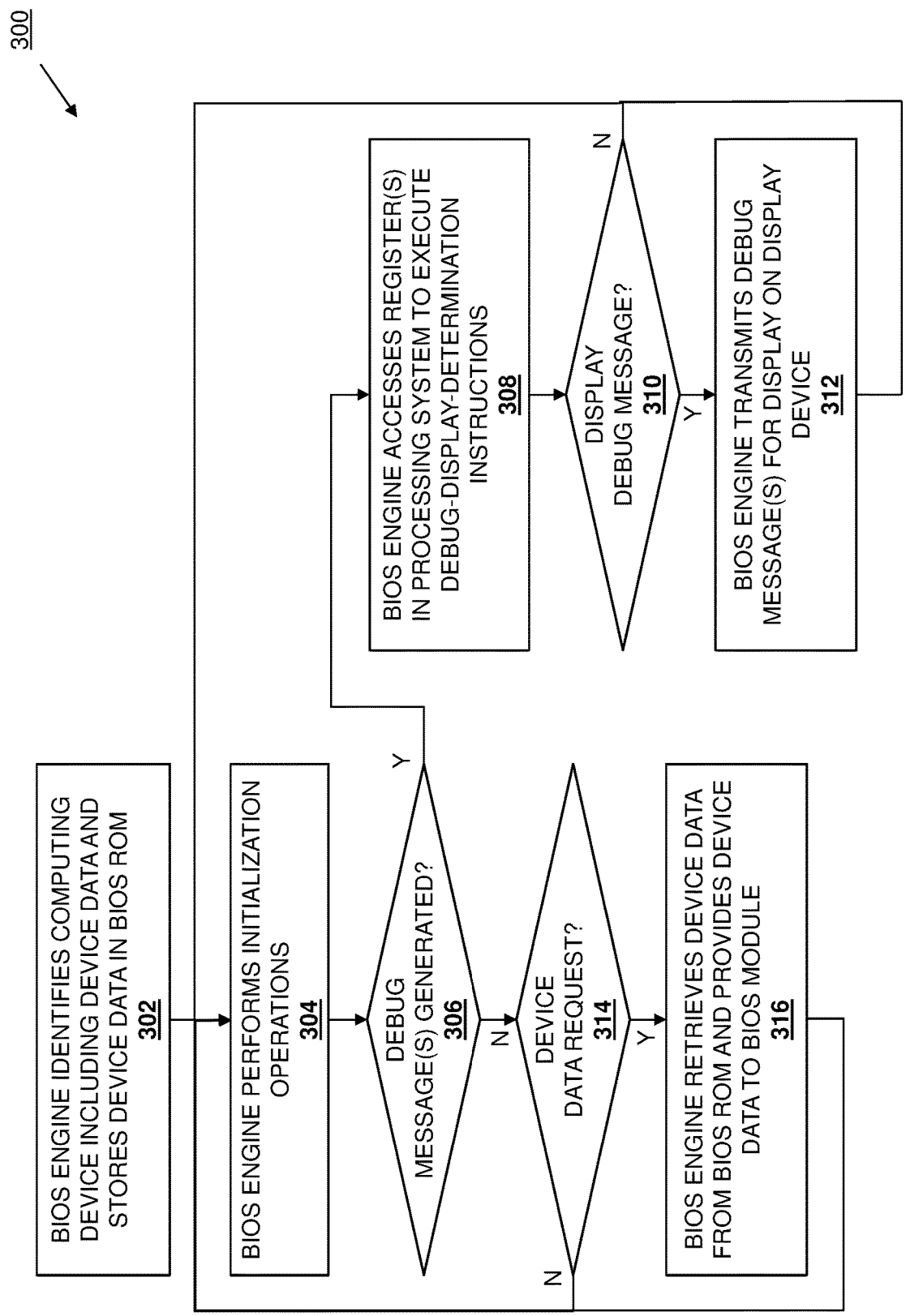
FIG. 3 is a flow chart illustrating an embodiment of a method for initializing a computing system.

Referring now to FIG. 3, an embodiment of a method 300 for initializing a computing system is illustrated. As discussed below, the systems and methods of the present disclosure provide for decreases in the time needed to perform computing system initialization operations relative to conventional computing device initialization techniques. For example, debug-message-display-determination instructions may be stored in at least one register in a BIOS processing system in a computing system (rather than in a memory system external to the BIOS processing system as is done in conventional computing system initialization systems), and a BIOS engine provided by the BIOS processing system may generate at least one first debug message during initialization operations, access the at least one register included in the processing system to execute the debug-message-display-determination instructions and, in response, determine that the at least one first debug message should be displayed and transmit the at least one first debug message to a management device such that the management device displays the at least one first debug message.

Furthermore, in some examples, the BIOS engine may identify device data for a computing device in the computing system that is coupled to the BIOS processing system by a low speed I/O access connection, and then copy and store that device data in a BIOS ROM that is accessible to the BIOS processing system. Subsequently, during initialization operations, the BIOS engine may determine that at least one BIOS module provided by the BIOS engine requires the device data and, in response, retrieve the device data from the BIOS ROM and provide the device data to the at least one BIOS module. As such, debug message display determinations may be performed faster than with conventional computing system initialization techniques due to the BIOS processing system executing the debug-message-display-determination instructions stored in its register(s) rather than having to access a memory system external to that BIOS processing system, while device data retrieval of device data for a computing device may be performed faster than with conventional computing system initialization techniques due to that device data being stored in the BIOS ROM, which provides faster access than the low speed I/O access connection with the computing device that is available to the BIOS processing system. As such, the time needed to perform initialization operations is reduced, providing for enhanced user experiences, reduced manufacturing times, more efficient development of computing systems, and/or other benefits that will be apparent to one of skill in the art in possession of the present disclosure.

In some embodiments, during or prior to the method 300, debug-message-display-determination instructions, code, or other data may be stored in the register(s) 204a included in the BIOS processing system 204. For example, as discussed above, the register(s) 204a may be MMX registers included in a CPU available from INTEL® Corporation of Santa Clara, Calif., United States, and during or prior to the method 300, a processing system manufacturer (e.g., INTEL® Corporation), computing system manufacturer, or other entity associated with the computing system 200 may provide the debug-message-display-determination instructions in the register(s). As will be appreciated by one of skill in the art in possession of the present disclosure, the debug-message-display-determination instructions provided in the register(s) 204a may include any instructions, code, or other data that is utilized by the BIOS engine 208 during initialization operations for the computing system to determine whether to provide debug messages generated during initialization operations for display on a display device and, as such, a wide variety of instructions, code, or other data will fall within the scope of the present disclosure.

The method 300 begins at block 302 where a BIOS engine identifies a computing device including device data, and stores the device data in a BIOS ROM. In an embodiment, at block 302, the BIOS engine 208 in the computing system 200 (e.g., a low-speed I/O access management sub-engine provided by a management driver include in the BIOS drivers) may operate at block 302 to identify computing device(s) including device data that is accessed during initialization operations by the BIOS module(s) 208a. As discussed above, computing devices may be coupled to the BIOS processing system 204 via relatively low speed I/O access connections, and may include device data that is retrieved by one or more of the BIOS modules 208a during initialization operations, which can delay the completion of the initialization operations, particularly in the event that the device data is relatively large in size. For example, similarly as discussed above, the computing device(s) 210 may include PCIe devices having VPD, and the BIOS module(s)

208a in the BIOS engine 208 may utilize addresses and data ports in order to transfer the VPD from VPD registers in the PCIe device/computing device 210 to a BIOS storage during initialization operations (e.g., by communicating with the PCIe hardware and polling, for every 4 bytes of VPD, a "bit 15" flag that is associated with the VPD port and that indicates when the VPD transfer between the VPD register and the BIOS storage is completed, with the "bit 15" flag polled until the hardware finishes the 4 byte VPD transfer or a timeout happens, after which VPD may be read), which is just one example of a relatively large amount of data that does not frequently change (e.g., "fixed" data) and that the BIOS modules 208a in the BIOS engine 208 may collect via a relatively low-speed I/O access connection, and one of skill in the art in possession of the present disclosure will recognize that other types of relatively large "fixed" data (e.g., SPD data) accessible in other computing devices via relatively low speed I/O access connections will fall within the scope of the present disclosure as well.

As such, in some embodiments, the identification of the computing device(s) including device data that should be stored in the BIOS ROM in the BIOS memory system 206 at block 302 according to the teachings of the present disclosure may include the identification of the computing device(s) 210 in the computing system 200 that are connected to the BIOS processing system 204 by a relatively low speed I/O access connection, the identification of the computing device(s) 210 in the computing system 200 that include a relatively large amount of device data that is changed relatively infrequently, and/or the identification of the computing device(s) 210 in the computing system 200 that include other attributes that would result in an extended time needed for completing the initialization operations for the computing system 200 using conventional device data retrieval techniques. In different embodiments, the identification of computing devices at block 302 as including device data that should be stored in the BIOS ROM according to the teachings of the present disclosure may include the identification of the computing device(s) 210 that are computing device types that match computing device types stored in a database that is accessible to the BIOS processing system 204 (e.g., PCIe computing device types like those discussed above that include VPD, etc.), the testing of the retrieval of device data via the connection to the computing device(s) 210 to determine whether the retrieval of that device data requires an amount of time that qualifies that connection as a "low speed I/O access connection", as well as any other identification techniques that one of skill in the art in possession of the present disclosure would recognize as providing for the identification of a low speed I/O access connection to a computing device that would delay the completion of initialization operations using conventional data device retrieval techniques as discussed above.

Figure 4:
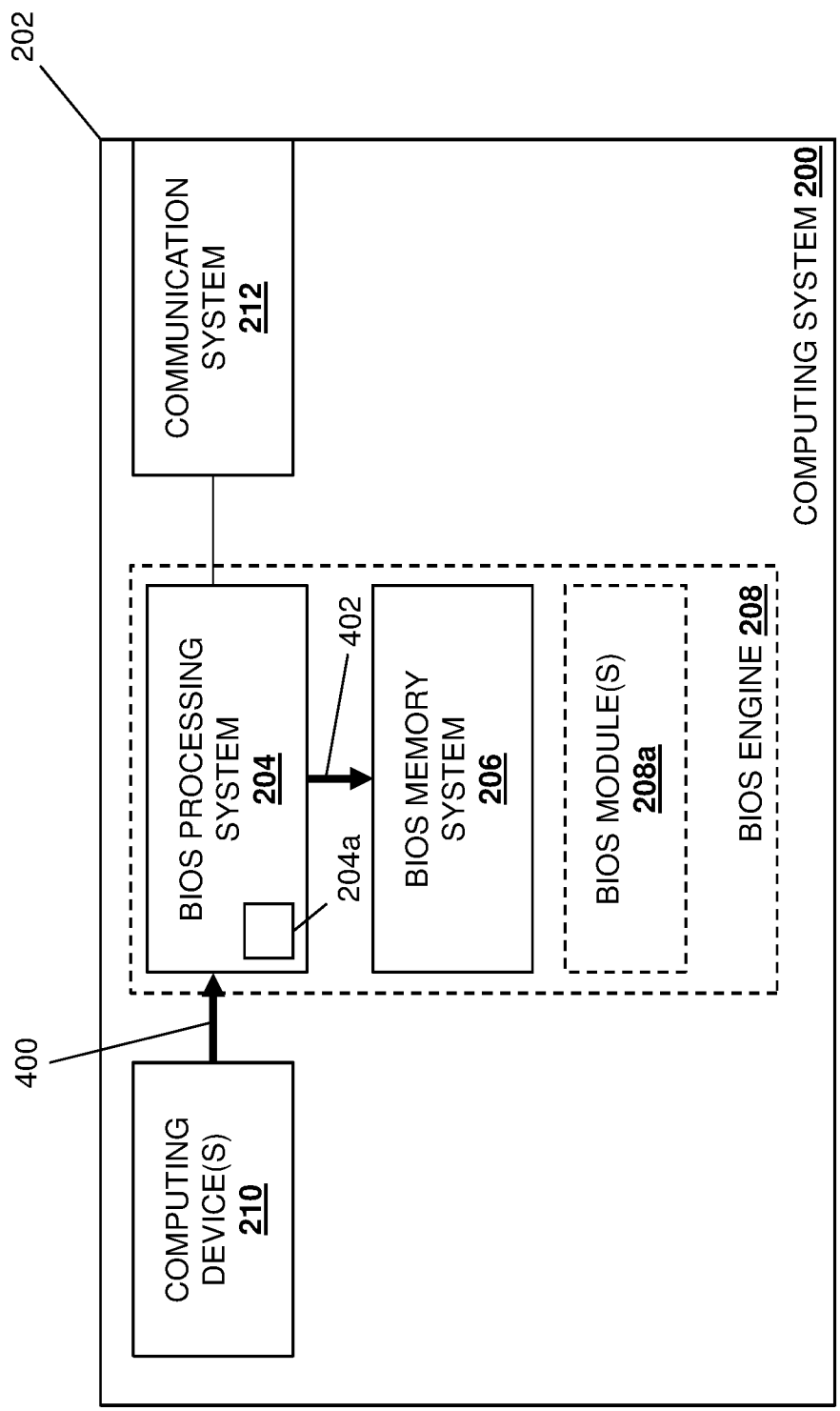
FIG. 4 is a schematic view illustrating an embodiment of the computing system initialization system of FIG. 2 operating during the method of FIG. 3.

FIG. 4 illustrates how the BIOS processing system 204/BIOS engine 208 may perform retrieval operations 400 to retrieve device data from computing device(s) identified at block 302, and perform storage operations 402 to store that device data in the BIOS ROM included in the BIOS memory system 206. Thus, in some embodiments following block 302, relatively large amounts of "fixed" device data for any of the computing device(s) 210 that are connected to the BIOS processing system 204 by a relatively low speed I/O access connection may be copied, retrieved, and/or otherwise provided to the BIOS processing system 204, and then stored in a BIOS ROM included in the BIOS memory system 206. However, while a BIOS ROM is described as being used to store the device data at block 302, one of skill in the art in possession of the present disclosure will appreciate that other relatively higher speed, non-volatile, BIOS-accessible storage subsystems (e.g., an APACHE PASS® ROM device available from INTEL® Corporation of Santa Clara, Calif., United States) may be utilized in place of the BIOS ROM while remaining within the scope of the present disclosure as well. As such, the identification of device data associated with computing devices and the storage of that device data in storage subsystem connected to the BIOS processing system 204 by a relatively higher speed I/O access connection may be performed in a variety of manners that fall within the scope of the present disclosure as well.

The method 300 then proceeds to block 304 where the BIOS engine performs initialization operations. In an embodiment, at block 304, the computing system 200 may be powered on, started up, reset, booted, and/or otherwise initialized such that the BIOS engine 204 performs a Power On Self Test (POST), as well as any of a variety of initiation operations that would be apparent to one of skill in the art in possession of the present disclosure. As will be appreciated by one of skill in the art in possession of the present disclosure, the initialization operations performed by the BIOS engine 204 at block 304 may include a variety of initialization sub-operations performed by the BIOS module(s) 208a provided by BIOS drivers, and thus any initialization operations and/or sub-operations known in the art may be performed at block 304 while remaining within the scope of the present disclosure.

The method 300 then proceeds to decision block 306 where it is determined whether debug message(s) have been generated. In an embodiment, at decision block 306, the BIOS engine 208 may operate to determine whether debug message(s) have been generated during the initialization operations. For example, the initialization sub-operations performed by the BIOS module(s) 208a discussed above may result in the generation of debug messages, logs, and/or other data that may be subsequently utilized by an administrator or other user of the computing system 200 in order to improve the operation of the computing system 200, address any issues occurring during the initialization operations, and/or for any other debug message uses known in the art. One of skill in the art in possession of the present disclosure will recognize that the display of such debug messages may be optional in that the computing system 200 may give an administrator or other user an option to enable or disable the display of those debug messages, and thus the method 300 discussed above may be performed when the display of such debug messages has been enabled (e.g., manually, automatically, by default, and/or using any other debug display enablement techniques that would be apparent to one of skill in the art in possession of the present disclosure.) As such, at decision block 306, the BIOS engine 208 may monitor whether the initialization sub-operations performed by any of the BIOS module(s) 208a have resulted in the generation of debug message(s).

If, at decision block 306, it is determined that debug message(s) have been generated, the method 300 proceeds to block 308 where the BIOS engine 208 accesses register(s) in a processing system to execute debug-display-determination instructions. In an embodiment, at block 308 and in response to determining that debug message(s) have been generated at decision block 306, the BIOS engine 208 may operate to access the register(s) 204a in the BIOS processing system 204 in order to execute the debug-display-determination instructions that were stored in those register(s) 204a as discussed above. As discussed above, the BIOS engine 208 may operate to determine whether any debug message(s) generated during the initialization operations should be displayed via the execution of the debug-display-determination instructions and, as discussed above, one of skill in the art in possession of the present disclosure will recognize that the debug-display-determination instructions may include any instructions, code, or other data that is utilized by the BIOS engine 208 to determine whether to provide debug messages generated during initialization operations for display on a display device. As will be appreciated by one of skill in the art in possession of the present disclosure, the storage of the debug-display-determination instructions in the registers(s) 204a provides an identical and consistent storage space that may be utilized by any of the BIOS module(s) 208a to query the debug-display-determination instructions, rather than having to query instructions stored external to the processing system 204. As such, in some embodiments, conventional BIOS code may be modified to point to the debug-display-determination instructions in the register(s) 204a rather than the conventional location for debug-display-determination instructions that is provided in a storage subsystem that is external to the BIOS processing system 204.

The method 300 then proceeds to decision block 310 where it is determined whether to display the debug message(s). In an embodiment, at decision block 310, the BIOS engine 208 may operate to determine whether to display the debug message(s) generated at decision block 306 (i.e., via the execution of the debug-display-determination instructions in the register(s) 204a of the BIOS processing system 204.) One of skill in the art in possession of the present disclosure will appreciate that the storage of the debug-display-determination instructions in the register(s) 204a reduces the time needed by the BIOS processing system 204 to access and execute the debug-display-determination instructions relative to conventional computing systems that store such debug-display-determination instructions in the BIOS memory system 206, as the register(s) 204a are inside/included in/part of the processing system (e.g., a CPU), and thus provide a "local" storage for the BIOS processing system that is associated with quicker access than the BIOS memory system 206 (i.e., which requires associated memory system requests and responses that increase the amount of time needed to executed those debug-display-determination instructions.) As such, the execution of the debug-display-determination instructions in the register(s) 204a by the BIOS processing system 204 (e.g., for any of the BIOS modules 208a) may be completed "inside" the BIOS processing system 204, which can reduce (and almost eliminate) the associated processing time needed to determine whether to display the debug message(s) that were generated at decision block 306.

If at decision block 310, it is determined that the debug message(s) should not be displayed, the method 300 returns to block 304. As such, when debug messages are generated during the initialization operations, the method 300 may loop to access the register(s) 204a in the processing system 204 to execute the debug-display-determination instructions and determine that those debug messages should not be displayed. If at decision block 310 it is determined that debug message(s) should be displayed, the method 300 proceeds to block 312 where the BIOS engine transmits the debug message(s) for display on a display device. In an embodiment, at block 312, the BIOS engine 208 may operate to transmit the debug message(s) that were generated at decision block 306 for display on a display device. For example, with reference to FIG. 5, the computing system 200 is illustrated as coupled to a management device 500 via its communication system 212. In an embodiment, the management device 500 may be provided by the IHS 100 discussed above with reference to FIG. 1 and/or may include some or all of the components of the IHS 100, and in specific examples may be provided by a management console, although the transmission of the debug message(s) for display on any other display device (including one provided with the computing system 200) will fall within the scope of the present disclosure as well. As such, while illustrated and discussed as a management device directly coupled to the communication system in the example provided, one of skill in the art in possession of the present disclosure will recognize that the functionality of the management device 500 discussed below may be provided by other devices that are coupled to the computing system 200 in any other manner and configured to operate similarly as management device 500 discussed below.

Figure 5:
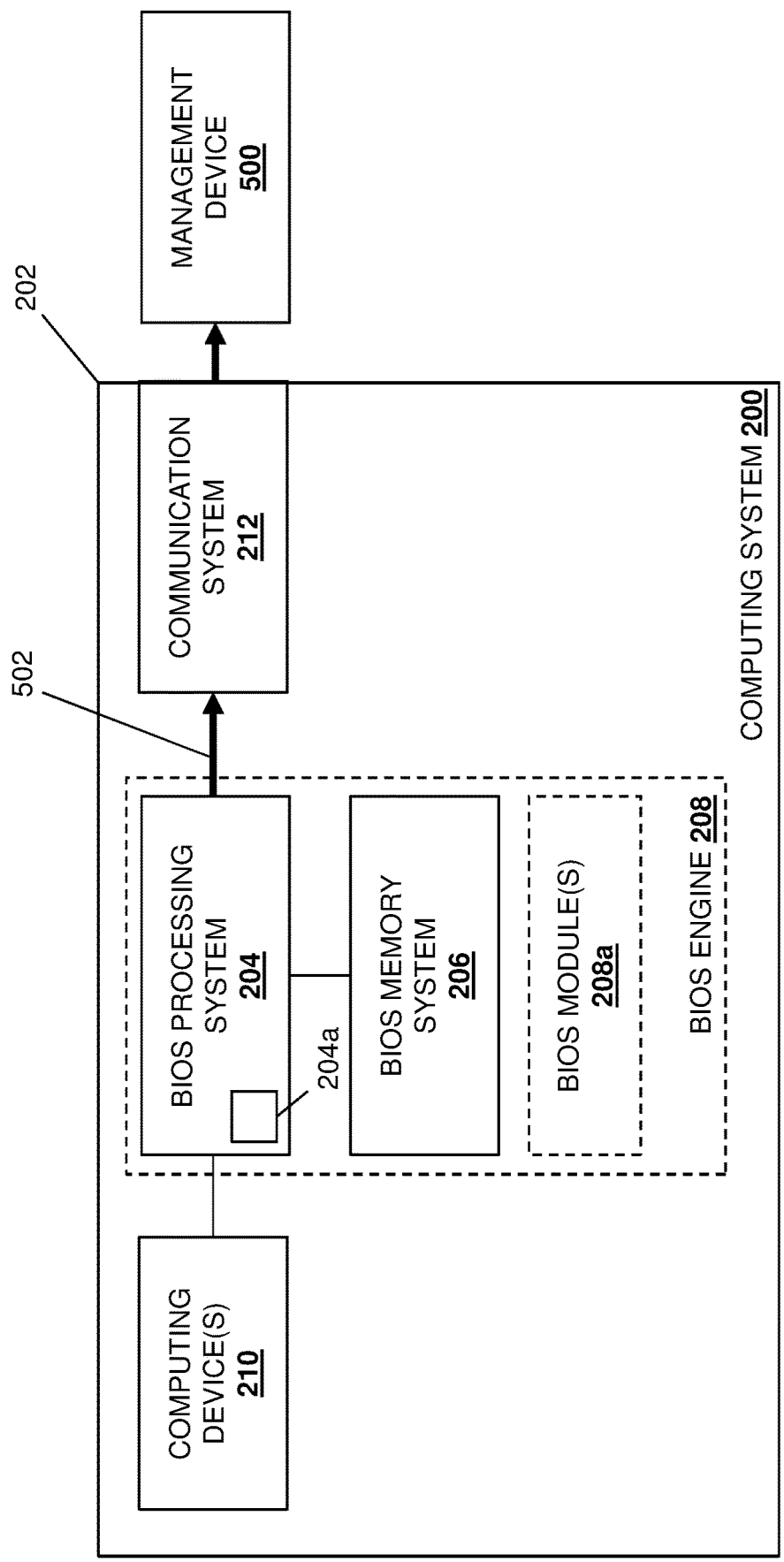
FIG. 5 is a schematic view illustrating an embodiment of the computing system initialization system of FIG. 2 operating during the method of FIG. 3.

As illustrated in FIG. 5, at block 312, the BIOS processing system 204/BIOS engine 208 may operate to perform transmission operations 502 to transmit the debug message(s) via its communication system 212 to the management device 500, and one of skill in the art in possession of the present disclosure will appreciate that the management device 500 may then provide those debug messages for display on a display device included on the management device 500 such that a user of the management device 500 may view those debug message(s). The method 300 then returns to block 304. As such, when debug messages are generated during the initialization operations, the method 300 may loop to access the register(s) 204a in the processing system 204 to execute the debug-display-determination instructions and determine that those debug messages should be displayed and, in response, transmit those debug message(s) for display on a display device. Experimental embodiments of the present disclosure have provided reductions of up to 40% in the time needed to perform initialization operations that include the display of debug messages, which provides an enhanced user experience, reduces manufacturing times for the computing system 200, increases computing system development efficiencies for the computing system 200, as well as provides other benefits that would be apparent to one of skill in the art in possession of the present disclosure.

Returning to decision block 306, if at decision block 306 it is determined that no debug message(s) have been generated, the method 300 proceeds to decision block 314 where it is determined whether a request has been received for device data. In an embodiment, at decision block 314, the BIOS engine 208 may monitor for a request from a BIOS module 208a for device data associated with a computing device 210. As discussed above, during initialization operations, BIOS module(s) 208a may require device data associated with the computing device(s) 210, and thus may provide a request to the BIOS engine 208 for that device data at decision block 314. Continuing with the examples provided above, the BIOS engine 208 may monitor for a request from a BIOS module 208a for VPD from a PCIe device that provides one of the computing device(s) 210. However, similarly as discussed above, at decision block 314 the BIOS engine 208 may monitor for requests for SPD data from one of the computing device(s) 210, as well as any other data from any other computing devices that would be apparent to one of skill in the art in possession of the present disclosure.

Figure 6:
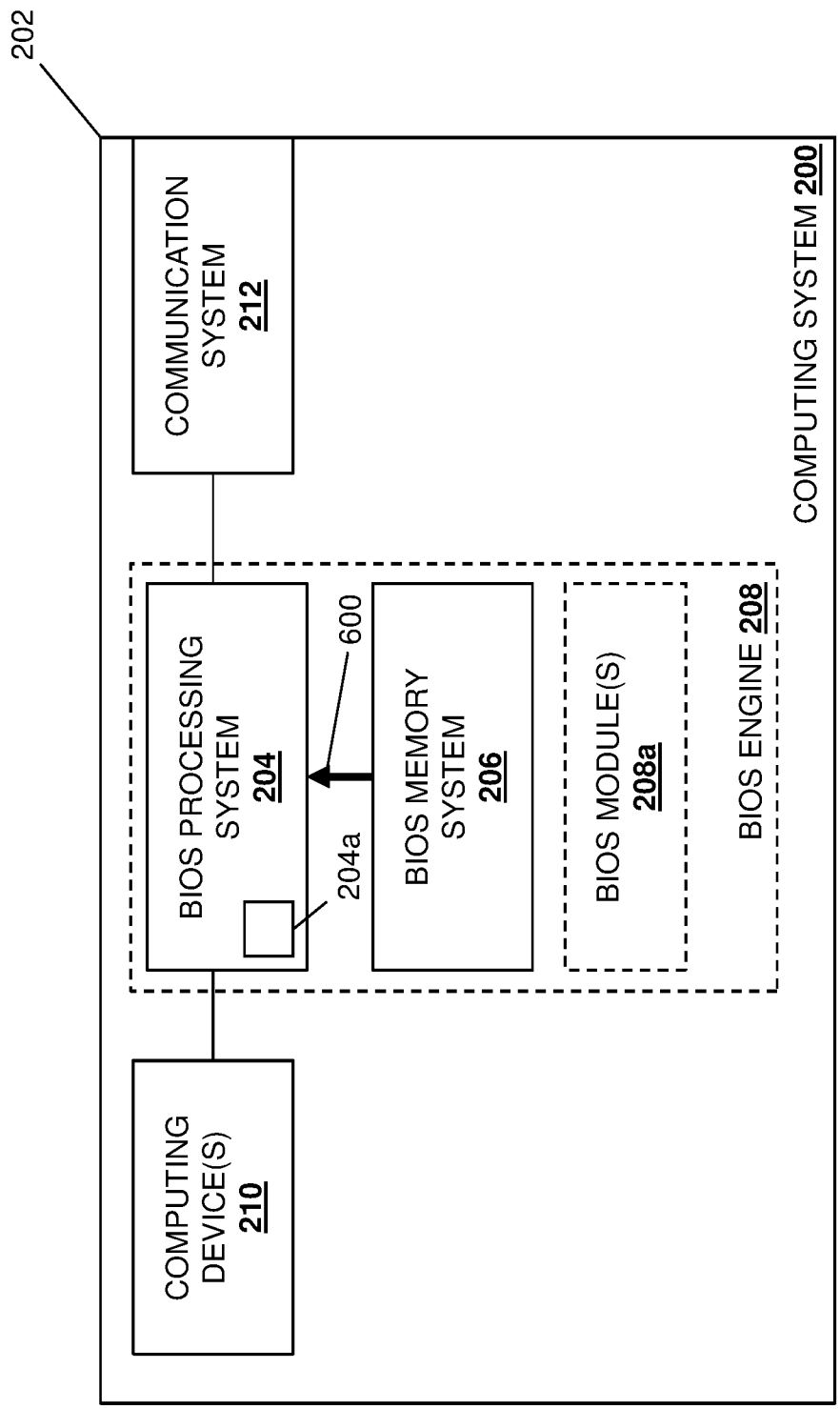
FIG. 6 is a schematic view illustrating an embodiment of the computing system initialization system of FIG. 2 operating during the method of FIG. 3.

If at decision block 314 it is determined that no request has been received for the device data, the method 300 returns to block 304. As such, when no debug messages are generated and no requests are received for device data during the initialization operations, the method 300 may loop to continue to perform initialization operations (e.g., until those initialization operations are completed, after which the method 300 may end.) If at decision block 314 it is determined that a request has been received for the device data, the method 300 proceeds to block 316 where the BIOS engine retrieves the device data from the BIOS ROM and provides that device data to a BIOS module. As illustrated in FIG. 6, in an embodiment of block 316, the BIOS processing system 204/BIOS engine 208 (e.g., a low-speed I/O access management sub-engine provided by a management driver include in the BIOS drivers) may retrieve the device data from the BIOS ROM included in the BIOS memory system 206 in order to provide that device data to the BIOS module 208a that requested it. As will be appreciated by one of skill in the art in possession of the present disclosure, the retrieval of the device data associated with a computing device 210 from the BIOS ROM included in the BIOS memory system 206 may utilize a relatively high speed I/O access connection between the BIOS processing system 204 and that BIOS ROM (e.g., via quad I/O read operations enabled with the BIOS ROM) as compared to the relatively low speed I/O access connection between the BIOS processing system 204 and that computing device 210, discussed above. As such, the time needed for the retrieval of the device data for BIOS modules 208a during initialization operations is reduced relative to conventional computing system initialization systems. Furthermore, multiple BIOS modules 208a may retrieve the same device data from the BIOS ROM over multiple iterations of the method 300, and one of skill in the art in possession of the present disclosure will appreciate that the reduced access times associated with the retrieval of that device data by multiple different BIOS modules further reduces the time necessary to complete the initialization operations. The method 300 then returns to block 304.

As such, the method 300 may loop to retrieve device data associated with computing devices that are connected to the BIOS processing system 204 via low-speed I/O access connections via a relatively high-speed I/O access connection to the BIOS ROM in which that device data was previous copied from that computing device whenever requests for that device data are received during initialization operations. Experimental embodiments of the present disclosure have been found to reduce the time needed to perform device data retrieval during initialization operations by several seconds, and one of skill in the art in possession of the present disclosure will appreciate that initialization operation time improvements will depend on how much relatively low speed I/O access is performed in any particular computing system. As such, a better user experience is provided, as well as reduced manufacturing costs for the computing system 200, increased developmental efficiencies for the computing system 200, and/or other benefits that would be apparent to one of skill in the art in possession of the present disclosure.

One of skill in the art in possession of the present disclosure will appreciate that while the device data stored in the BIOS ROM included in BIOS memory system 206 is relatively "fixed" data that does not change often, in some situations that device data may be modified such as, for example, when hardware or firmware changes associated with the corresponding computing device 210 occur. In such embodiments, a flag or checksum (e.g., a VPD checksum in the example provided above) may be utilized to identify the change in the device data and, as such, the BIOS engine 208 may detect that device data change and, in response, may copy the new device data to the BIOS ROM included in the BIOS memory system 206 (e.g., over the previously copied device data.) As will be appreciated by one of skill in the art in possession of the present disclosure, the conditions for the copying of new device data associated with a computing device may be detected during "cold" or "warm" boot or other initialization operations, in response to the addition of a computing device to the computing system 200, and/or in a variety of other situations that would be apparent to one of skill in the art in possession of the present disclosure. Furthermore, while the device data is described as being copied to the BIOS ROM included in the BIOS memory system 206 prior to performing the initialization operations, device data associated with a computing device may be copied to the BIOS ROM whenever it is requested by a BIOS module 208a (e.g., during initialization operations), which allows other BIOS modules to access that device data quickly after the initial copying of that device data to the BIOS ROM.

Thus, systems and methods have been described that provide for decreases in the time needed to perform computing system initialization operations relative to conventional computing device initialization techniques. For example, debug-message-display-determination instructions may be stored in at least one register in a BIOS processing system in the computing system (rather than in a memory system external to the BIOS processing system as is done in conventional computing system initialization systems), and a BIOS engine provided by the BIOS processing system may generate at least one first debug message during initialization operations, access the at least one register included in the processing system to execute the debug-message-display-determination instructions and, in response, determine that the at least one first debug message should be displayed and transmit the at least one first debug message to a management device such that the management device displays the at least one first debug message. Furthermore, in some examples, the BIOS engine may identify device data for a computing device in the computing system that is coupled to the BIOS processing system by a low speed I/O access connection, and copy and store that device data in a BIOS ROM that is accessible to the BIOS processing system. Subsequently, during initialization operations, the BIOS engine may determine that at least one BIOS module provided by the BIOS engine requires the device data and, in response, retrieve the device data from the BIOS ROM and provide the device data to the at least one BIOS module. As such, debug message display determinations may be performed faster than with conventional computing system initialization techniques due to the BIOS processing system executing the debug-message-display-determination instructions stored in its register(s) rather than having to access a memory system external to that BIOS processing system, while device data retrieval of device data for a computing device may be performed faster than with conventional computing system initialization techniques due to that device data being stored in the BIOS ROM, which provides for faster access relative to the low speed I/O access connection with the computing device that is available to the BIOS processing system.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A computing system initialization system, comprising:
a management device;
a computing device that is coupled to the management device and that includes:
a processing system including at least one register storing debug-message-display-determination instructions; and
a memory system that is coupled to the processing system and that includes Basic Input/Output System (BIOS) instructions that, when executed by the processing system, cause the processing system to provide a BIOS engine that is configured to:
begin initialization operations;
generate, during the initialization operations, at least one first debug message;
access the at least one register included in the processing system to execute the debug-message-display-determination instructions and, in response, determine that the at least one first debug message should be displayed; and
transmit, in response to determining that the at least one first debug message should be displayed, the at least one first debug message to the management device such that the management device displays the at least one first debug message.

2. The system of claim 1, wherein the BIOS engine is configured to:
generate, during the initialization operations, at least one second debug message; and
access the at least one register included in the processing system to execute the debug-message-display-determination instructions and, in response, determine that the at least one second debug message should not be displayed.

3. The system of claim 1, wherein the processing system is provided by a Central Processing Unit (CPU), and wherein the at least one register included in the processing system is provided by at least one MultiMedia eXtension (MMX) register in the CPU.

4. The system of claim 1, wherein the BIOS engine is configured to:
provide a plurality of BIOS modules that are each configured to access the at least one register included in the processing system to execute the debug-message-display-determination instructions and, in response, determine whether at least one debug message should be displayed.

5. The system of claim 1, wherein the memory system includes a BIOS Read-Only-Memory (ROM), and wherein the BIOS engine is configured to:
identify, prior to the initialization operations, a computing device that is coupled to the processing system and that includes device data;
store, prior to the initialization operations, the device data from the computing device in the BIOS ROM;
determine, during the initialization operations, that at least one BIOS module provided by the BIOS engine requires the device data; and
retrieve, during the initialization operations, the device data from the BIOS ROM and provide the device data to the at least one BIOS module.

6. The system of claim 5, wherein the BIOS engine is configured to:
perform, prior to the initialization operations, at least one computation on the device data to generate a device data result;
store, prior to the initialization operations, the device data result in the BIOS ROM;
determine, during the initialization operations, that the at least one BIOS module provided by the BIOS engine requires the device data result; and
retrieve, during the initialization operations, the device data result from the BIOS ROM and provide the device data result to the at least one BIOS module.

7. An Information Handling System (IHS), comprising:
a processing system; and
a memory system that is coupled to the processing system and that includes instructions that, when executed by the processing system, cause the processing system to provide a Basic Input/Output System (BIOS) engine that is configured to:
begin initialization operations;
generate, during the initialization operations, at least one first debug message;
access at least one register included in the processing system to execute the debug-message-display-determination instructions and, in response, determine that the at least one first debug message should be displayed; and;
transmit, in response to determining that the at least one first debug message should be displayed, the at least one first debug message for display on a display device.

8. The IHS of claim 7, wherein the BIOS engine is configured to:
generate, during the initialization operations, at least one second debug message; and
access the at least one register included in the processing system to execute the debug-message-display-determination instructions and, in response, determine that the at least one second debug message should not be displayed.

9. The IHS of claim 7, wherein the processing system is provided by a Central Processing Unit (CPU), and wherein the at least one register included in the processing system is provided by at least one MultiMedia eXtension (MMX) register in the CPU.

10. The IHS of claim 7, wherein the BIOS engine is configured to:
provide a plurality of BIOS modules that are each configured to access the at least one register included in the processing system to execute the debug-message-display-determination instructions and, in response, determine whether at least one debug message should be displayed.

11. The IHS of claim 7, wherein the memory system includes a BIOS Read-Only-Memory (ROM), and wherein the BIOS engine is configured to:
identify, prior to the initialization operations, a first computing device that is coupled to the processing system and that includes first device data;
store, prior to the initialization operations, the first device data from the first computing device in the BIOS ROM;
determine, during the initialization operations, that at least one BIOS module provided by the BIOS engine requires the first device data; and retrieve, during the initialization operations, the first device data from the BIOS ROM and provide the first device data to the at least one BIOS module.

12. The IHS of claim 11, wherein the BIOS engine is configured to:
perform, prior to the initialization operations, at least one computation on the device data to generate a device data result;
store, prior to the initialization operations, the device data result in the BIOS ROM;
determine, during the initialization operations, that the at least one BIOS module provided by the BIOS engine requires the device data result; and
retrieve, during the initialization operations, the device data result from the BIOS ROM and provide the device data result to the at least one BIOS module.

13. The IHS of claim 11, wherein the BIOS engine is configured to:
determine that the first device data included in the first computing device has changed to second device data; and
replace the first device data from the first computing device with the second device data from the first computing device in the BIOS ROM.

14. A method for initializing a computing system, comprising:
beginning, by a Basic Input/Output System (BIOS) engine provided by a processing system, initialization operations;
generating, by the BIOS engine during the initialization operations, at least one first debug message;
accessing, by the BIOS engine, at least one register included in the processing system to execute debug-message-display-determination instructions stored in the at least one register and, in response, determining that the at least one first debug message should be displayed; and
transmit, by the BIOS engine in response to determining that the at least one first debug message should be displayed, the at least one first debug message for display on a display device.

15. The method of claim 14, further comprising:
generating, by the BIOS engine during the initialization operations, at least one second debug message; and
accessing, by the BIOS engine, the at least one register included in the processing system to execute the debug-message-display-determination instructions and, in response, determine that the at least one second debug message should not be displayed.

16. The method of claim 14, wherein the processing system is provided by a Central Processing Unit (CPU), and wherein the at least one register included in the processing system is provided by at least one MultiMedia eXtension (MMX) register in the CPU.

17. The method of claim 14, further comprising:
providing, by the BIOS engine, a plurality of BIOS modules that are each configured to access the at least one register included in the processing system to execute the debug-message-display-determination instructions and, in response, determining whether at least one debug message should be displayed.

18. The method of claim 14, further comprising:
identifying, by the BIOS engine prior to the initialization operations, a first computing device that is coupled to the processing system and that includes first device data;
storing, by the BIOS engine prior to the initialization operations, the first device data from the first computing device in BIOS Read-Only-Memory (ROM);
determining, by the BIOS engine during the initialization operations, that at least one BIOS module provided by the BIOS engine requires the first device data; and
retrieving, by the BIOS engine during the initialization operations, the first device data from the BIOS ROM and provide the first device data to the at least one BIOS module.

19. The method of claim 18, further comprising:
performing, by the BIOS engine prior to the initialization operations, at least one computation on the first device data to generate a device data result;
storing, by the BIOS engine prior to the initialization operations, the device data result in the BIOS ROM;
determining, by the BIOS engine during the initialization operations, that the at least one BIOS module provided by the BIOS engine requires the device data result; and
retrieving, by the BIOS engine during the initialization operations, the device data result from the BIOS ROM and provide the device data result to the at least one BIOS module.

20. The method of claim 18, further comprising:
determining, by the BIOS engine, that the first device data included in the first computing device has changed to second device data; and
replacing, by the BIOS engine, the first device data from the first computing device with the second device data from the computing device in the BIOS ROM.

* * * * *

UNITED STATES PATENT AND TRADEMARK OFFICE
CERTIFICATE OF CORRECTION

PATENT NO. : 11,500,747 B2
APPLICATION NO. : 16/777086
DATED : November 15, 2022
INVENTOR(S) : Lee et al.

It is certified that error appears in the above-identified patent and that said Letters Patent is hereby corrected as shown below:

In the Claims

Claim 7, Column 14, Lines 26-27 "the debug-message-display-determination instructions" should be changed to --debug-message-display-determination instructions--

Signed and Sealed this
Twenty-first Day of February, 2023

Katherine Kelly Vidal
*Director of the United States Patent and Trademark Office*